May 28, 1968    D. BACHMANN ET AL    3,385,881
PROCESS FOR THE CONTINUOUS PREPARATION OF MONOMERIC
AND OLIGOMERIC BIS-2-HYDROXYETHYL PHTHALATES
Filed June 20, 1963    2 Sheets-Sheet 1
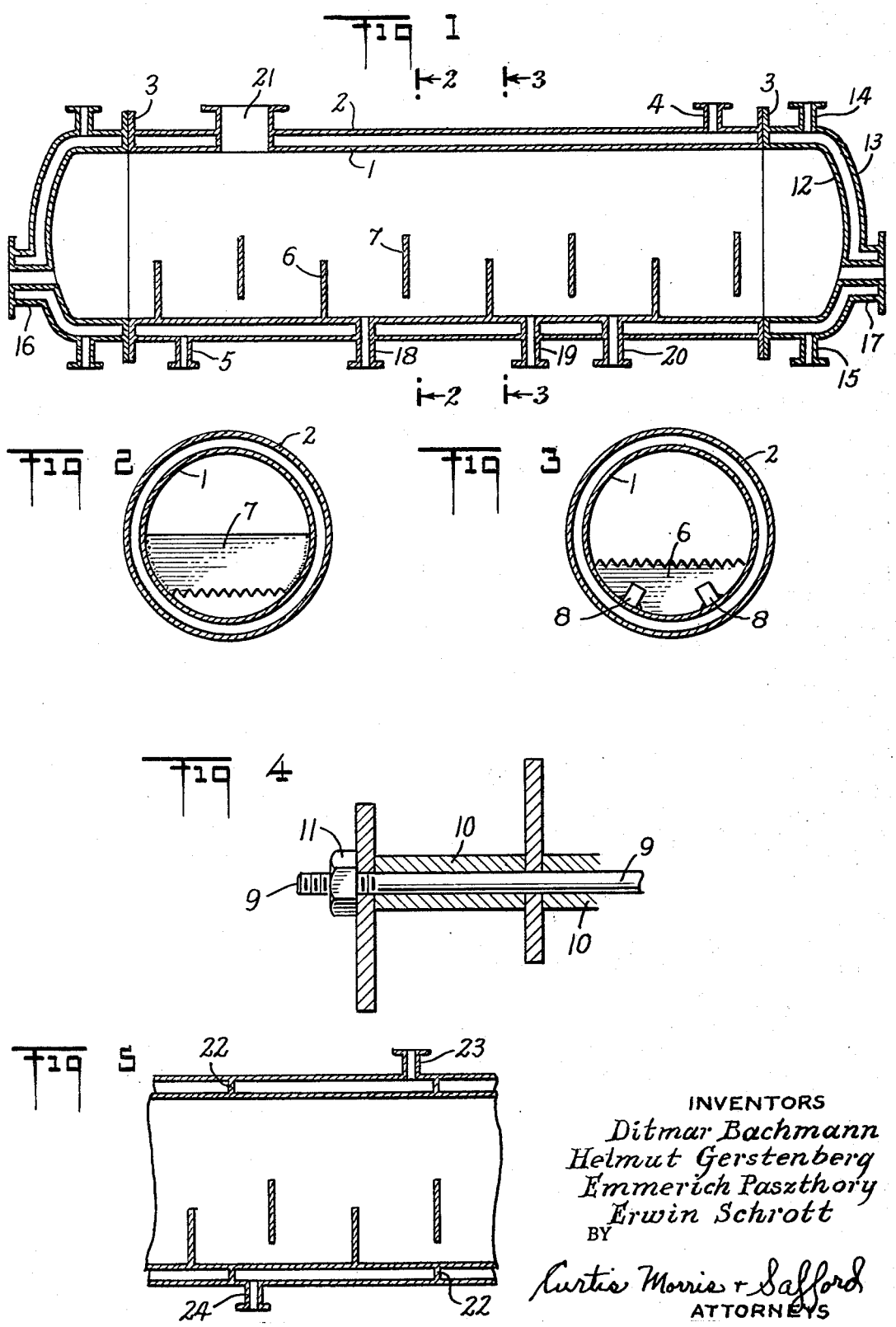
INVENTORS
Ditmar Bachmann
Helmut Gerstenberg
Emmerich Paszthory
Erwin Schrott
BY
Curtis Morris + Safford
ATTORNEYS

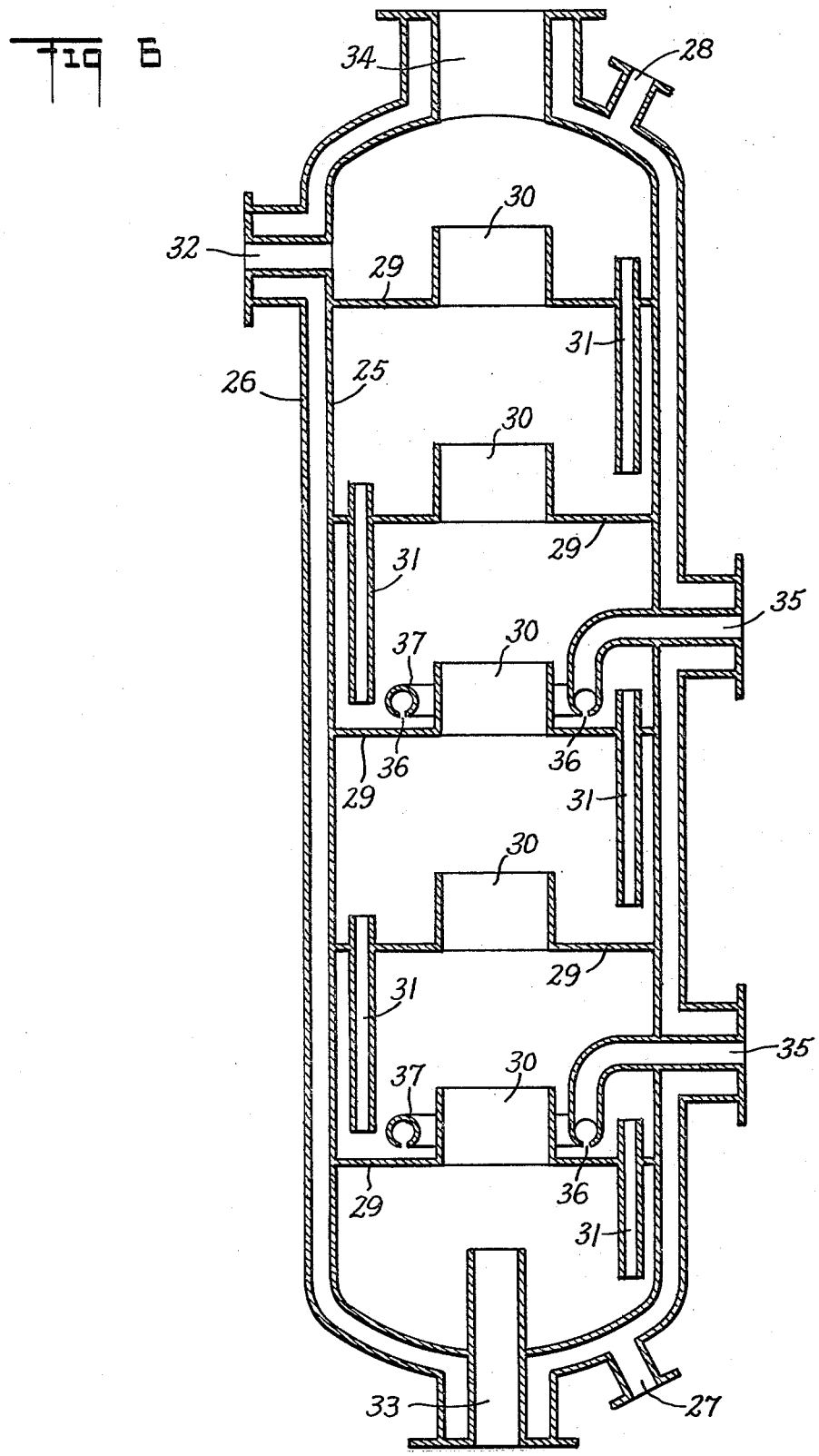

United States Patent Office 3,385,881
Patented May 28, 1968

3,385,881
PROCESS FOR THE CONTINUOUS PREPARATION OF MONOMERIC AND OLIGOMERIC BIS-2-HYDROXYETHYL PHTHALATES
Ditmar Bachmann, Hofheim, Taunus, Helmut Gerstenberg, Frankfurt am Main, Emmerich Paszthory, Hofheim, Taunus, and Erwin Schrott, Frankfurt am Main, Germany, assignors to Farbwerke Hoechst Aktiengesellschaft vormals Meister Lucius & Bruning, Frankfurt am Main, Germany, a corporation of Germany
Filed June 20, 1963, Ser. No. 289,343
Claims priority, application Germany, June 23, 1962, F 37,141
5 Claims. (Cl. 260—475)

The present invention relates to a process for preparing bis-2-hydroxyethyl terephthalates, bis-2-hydroxyethyl isophthalates or mixtures of bis-2-hydroxyethyl terephthalates and bis-2-hydroxyethyl isophthalates or their polymers of low molecular weight by subjecting dimethyl terephthalate, dimethyl isophthalate or a mixture of dimethyl terephthalate and dimethyl isophthalate to a continuous interchange of ester radicals with ethylene glycol in the presence of a catalyst for this reaction. The esters of terephthalic acid and isophthalic acid will hereinafter be referred to as phthalates.

Various processes are known for the interchange of ester radicals of dimethyl terephthalate with ethylene glycol. When the interchange of ester radicals is carried out discontinuously, it is brought about in conventional vessels provided with stirrers. A rectifying column applied to the vessel enables methanol that is free from ethylene glycol to be drawn off first and, when the interchange of ester radicals is terminated, the excess of ethylene glycol is drawn off. The continuous interchange of ester radicals is carried out in vertically arranged columns provided with installations of various kinds, the part of the apparatus from which methanol and ethylene glycol distill off serving as the reaction zone. Above the reaction zone dimethyl terephthalate and ethylene glycol are introduced together with the catalyst. The final product, which may contain higher-boiling by-products such as diethylene glycol, is drawn off, if required together with excess ethylene glycol. In order to avoid extensive formation of diethylene glycol, additional quantities of vaporous ethylene glycol are blown into the lower part of the reaction zone or a considerable excess of ethylene glycol is maintained in the sump. In this mode of operating ethylene glycol can be prevented from escaping together with the methanol vapors that form by the insertion of a rectifying element.

All of the known processes, however, have the disadvantage that the higher-boiling by-products that have formed, for example, diethylene glycol, remain in the product and can only be removed together with the product. Lower boiling by-products are condensed repeatedly in the preceding stages.

Now it has been found that the aforesaid disadvantages can be avoided and bis-2-hydroxyethyl esters of terephthalic acid and isophthalic acid and the polymers thereof of low molecular weight which contain up to 10 monomer units in the molecule can be prepared by the interchange of ester radicals of dimethyl terephthalate, dimethyl isophthalate or a mixture of dimethyl terephthalate and dimethyl isophthalate in the presence of a catalyst for the interchange of ester radicals with ethylene glycol, by carrying out the interchange in a heated apparatus subdivided into a plurality of parts in which the different stages of the process take place and into which apparatus ethylene glycol and dimethyl terephthalate, dimethyl isophthalate or a mixture of dimethyl terephthalate and dimethyl isophthalate are continuously introduced and from which the vapors that form and the bis-2-hydroxyethyl esters that form are continuously drawn off. According to the invention the vapors of methanol, ethylene glycol and by-products are immediately drawn off from the part of the apparatus in which they have formed and additional quantities of ethylene glycol are introduced into one or several parts of the apparatus.

The process according to the invention is advantageously carried out in the following way: liquid dimethyl terephthalate or a mixture of dimethyl terephthalate and dimethyl isophthalate, ethylene glycol and a catalyst for the interchange of ester radicals are continuously introduced into a vertical or horizontal reactor which is subdivided into chambers and which is heated to temperatures that are incrementally or continuously increased in the direction in which the reaction proceeds. The aforesaid substances are introduced at the place of the lowest temperature, and the reactants are then exposed to temperatures that are the higher the higher the degree of interchange of ester radicals. The last-mentioned temperatures are advantageously within the range of 150° to 240° C. The methanol forming during the interchange of ester radicals, a part of the ethylene glycol and volatile by-products, for example, acetaldehyde, are continuously drawn off as vapors directly from the vapor chamber that is common to all stages of the process, while care is taken that no recondensation takes place. The pressure in the reactor is advantageously within the range of 1 to 4 atmospheres. In order to maintain a desired molar ratio of ethylene glycol to phthaloyl radicals above 1:1 and to remove higher-boiling by-products, for example, diethylene glycol, additional quantities of liquid or, preferably, gaseous ethylene glycol are continuously introduced into one or several parts of the apparatus. The bis-2-hydroxyethyl phthalates that have formed or their polymers of low molecular weight are continuously drawn off together with a small quantity of unreacted and/or non vaporized ethylene glycol from the last stage and introduced into an apparatus in which subsequent polycondensation can take place. The liquid product obtained by the interchange of ester radicals contains less than 1% by weight of undesired by-products, for example, diethylene glycol and polyethylene glycols of higher molecular weight.

It is advantageous to carry out the process according to the invention in an apparatus comprising a vacuum tight cylindrical or conical casing which may be heated on all sides, which is arranged vertically and which is subdivided into a plurality of baffle chambers by means of trays inserted into the apparatus and which are provided with overflow weirs and which preferably can be heated. It is particularly advantageous that the cross-sectional area of these plates is equal only to a part, preferably 50 to 75% of the cross-sectional area of the casing.

The process according to the invention can just as well be carried out in an apparatus comprising a vacuum-tight, horizontal and, preferably, cylindrical casing which can be heated on all sides and which is subdivided into a plurality of baffle chambers by means of segmental baffle elements, which are preferably arranged in the lower part of the casing. It is also possible to dispose additional heating surfaces in the baffle chambers of the apparatus.

The characteristic features of the present invention are (1) that the methanol that forms, the partly evaporating ethylene glycol and volatile by-products are immediately removed and (2) that the proportion of ethylene glycol to phthaloyl radicals can be regulated in the different stages of the process by adding additional quantities of ethylene glycol. The ratio of ethylene glycol to phthaloyl radicals can also be influenced by control of the quantity of substances that evaporate. This can be varied by the temperature that is applied and by the dimensions of the heating surfaces.

Apparatus suitable for use in carrying out the process of the present invention is shown in the accompanying drawings, in which FIG. 1 is a side elevation in section of a first horizontally-arranged reactor;

FIG. 2 is a front elevation in section taken along line 2—2 of FIG. 1;

FIG. 3 is a front elevation in section taken along line 3—3 of FIG. 1;

FIG. 4 is a detailed view, partly in section, of an arrangement for sub-dividing an apparatus such as shown in FIG. 1 into a plurality of compartments;

FIG. 5 is a side elevation in section of a portion of a reactor like that of FIG. 1, showing an arrangement for subdivision of the heating jacket thereof; and FIG. 6 is a side elevation in section of a vertically arranged reactor according to the invention.

FIG. 1 shows a reactor comprising tubular cylindrical casing 1 surrounded by outer casing 2 defining a heating jacket. A heating agent is introduced between casing 1 and jacket 2 by inlet means 4. Outlet means 5 serve to remove the heating agent.

In the lower portions of casing 1, a plurality of partitions 6 and 7 are vertically arranged. The partitions may be welded to casing 1 as shown in FIG. 2, or may be supported in casing 1 by guide elements 8 welded to the casing, as shown in FIG. 3. As shown in FIGS. 2 and 3, partitions 6 and 7 may be notched to promote uniform liquid flow. Partition 6, shown in FIG. 3, serves as an overflow weir. Partition 7, shown in FIG. 2, functions as an underflow weir.

Alternatively, as shown more in detail in FIG. 4 of the drawings, a plurality of partitions may be mounted along rod 9 adapted to extend longitudinally within casing 1, provided with plurality of tubular segments 10 serving to space the partitions from one another. The arrangement is assembled by means of nuts 11 screwed onto the ends of rod 9.

Tubular cylindrical casing 1 is closed at the ends thereof by closures 12 each provided with heating jacket 13 and inlet means 14 and outlet means 15 respectively for introduction and removal of a heating agent. Closures 12 are joined to casing 1 by flange means 3. Ethylene glycol and molten dimethyl terephthalate are introduced through inlet means 16 in one closure, and bis-2-hydroxyethyl terephthalate is removed through outlet means 17 in the second closure. Additional quantities of ethylene glycol are introduced into casing 1 through inlet means 18, 19, and 20. Vapor forming in casing 1 is withdrawn via outlet means 21.

The annular volume defined between outer casing 2 and casing 1 of the reactor of FIG. 1 may be subdivided as shown in FIG. 5 by a plurality of partitions 22 enabling different segments or chambers of the reactor to be heated to different temperatures. As shown in FIG. 5, each segment of the reactor heating jacket may include inlet means 23 and outlet means 24 for respective introduction and removal of heating agent.

The reactor embodiment shown in FIG. 6 comprises vertically arranged cylindrical casing 25 and outer casing 26 defining a heating jacket. Inlet means 27 and outlet means 28 respectively serve for the introduction and removal of heating agent. The reactor is subdivided by trays 29 horizontally disposed within casing 25 at different vertical heights therein to define a plurality of portions in which different stages of the reaction occurring therein take place. Trays 29 include passage 30 for vapor and overflow tube 31 for liquid. In operation, ethylene glycol and molten dimethyl terephthalate are introduced into the reactor via inlet means 32. The bis-2-hydroxyethyl phthalate formed is drawn off through outlet means 33. Vapors of methanol, ethylene glycol, and by-products are all drawn off directly from that portion of the apparatus in which they are formed by way of vapor passages 30 and outlet means 34. Additional quantities of ethylene glycol are introduced via inlet means 35 suitably feeding annular distribution tubes 37 provided with bore-holes 36 through which vapors of the glycol are distributed over trays 29. If desired, separate overflow tubes for liquid, shown in FIG. 6 as tubes 31, may be omitted by disposing vapor passages 30 in such a way that they may serve at the same time as overflow tubes.

The following examples serve to illustrate the invention but they are not intended to limit it thereto.

Example 1

1.01 kg. of dimethyl terephthalate and 0.64 kg. of ethylene glycol in which 0.2 g. of zinc acetate dihydrate was dissolved were introduced per hour at a temperature of 170° C. into the first baffle chamber of a horizontal reactor which was heated on all sides by circulating oil and which was subdivided into 6 baffle chambers by means of 5 baffle elements. 0.32 kg. per hour of vaporous ethylene glycol having a temperature of 205° C. was introduced into the reaction mixture in the third baffle chamber and another 0.32 kg. per hour of ethylene glycol having a temperature of 205° C. was introduced into the reaction mixture in the fifth baffle chamber. 1.32 kg. of bis-2-hydroxyethyl terephthalate and 0.04 kg. of ethylene glycol were drawn off per hour at 231° C. from the sixth baffle chamber. About 0.33 kg. of methanol and about 0.60 kg. of ethylene glycol and by-products were drawn off per hour in the vapor state from the common vapor chamber and condensed. The pressure prevailing in the reactor was atmospheric pressure. The heating oil entered the reactor at about 240° C. at the place where the products were discharged and it left the reactor at about 182° C. at the place where the material was introduced. The reaction mixture remained in the reactor for about 2 hours.

Example 2

0.80 kg. of dimethyl terephthalate and 0.51 kg. of ethylene glycol which contained 0.16 g. of zinc acetate dihydrate were introduced per hour at a temperature of 170° C. into baffle chamber 1 of the reactor described in Example 1. 0.26 kg. of vaporous ethylene glycol having a temperature of 210° C. was introduced into the reaction mixture in the third baffle chamber and another 0.26 kg. of vaporous ethylene glycol having a temperature of 210° C. was introduced into the reaction mixture in the fifth baffle chamber. 0.98 kg. of polyethylene terephthalate having a low molecular weight, a specific viscosity of 0.08 (determined at 25° C. in a solution containing 0.1 g./100 cm.$^3$ of a mixture of 3 parts of phenol and 2 parts of tetrachlorethane) and a temperature of 241° C. was discharged per hour from baffle chamber 6. About 0.85 kg. of vapors comprising methanol, ethylene glycol and by-products was drawn off per hour from the common vapor chamber and condensed. The pressure prevailing in the reactor was atmospheric pressure. The heating oil was introduced into the reactor at a temperature of about 250° C. at the place where the reaction product was discharged and it left the reactor at a temperature of about 185° C. at the place where the reaction material was introduced. The reaction mixture remained in the apparatus for about 2.5 hours.

Example 3

0.93 kg. of dimethyl terephthalate, 0.08 kg. of dimethyl isophthalate and 0.64 kg. of ethylene glycol in which 0.023 g. of zinc acetate dihydrate was dissolved were introduced per hour at a temperature of 170° C. into the first baffle chamber of the reactor described in Example 1. 0.32 kg. of vaporous ethylene glycol having a temperature of 205° C. were introduced per hour into the reaction mixture in baffle chamber 3 and another 0.32 kg. of the vaporous ethylene glycol at 205° C. was introduced per hour into the reaction mixture in baffle chamber 5. About 1.3 kg. of a mixture of bis-(2-hydroxyethyl)-terephthalate and bis-(2-hydroxyethyl)-isophthalate, which in addition to these substances contained about 0.04 kg. of ethylene glycol, were drawn off per hour from baffle chamber 6 at a temperature of 232° C. From the common vapor chamber about 0.33 kg. of methanol and about 0.60 kg. of ethylene glycol and by-products were drawn off per hour and condensed. The pressure prevailing in the reactor was atmospheric pressure. The heating oil was supplied into the reactor at a temperature of about 240° C. at the place where the reaction products were discharged and it left the reactor at a temperature of about 182° C. at the place where the reaction material was introduced. The reaction mixture remained in the reactor for about 2 hours.

Example 4

1.01 kg. of dimethyl terephthalate and 0.64 kg. of ethylene glycol in which 0.2 g. of zinc acetate dihydrate was dissolved were introduced per hour at a temperature of 170° C. into the first, that is to say the uppermost, baffle chamber of a vertical reactor as shown in FIG. 6 of the accompanying drawing, which was heated on all sides by means of circulating oil and which was subdivided into six baffle chambers by means of five horizontally arranged trays. 0.32 kg. of vaporous ethylene glycol having a temperature of 205° C. was introduced per hour into the reaction mixture in the third baffle chamber from above and another 0.32 kg. of vaporous ethylene glycol having a temperature of 205° C. was introduced per hour into the reaction mixture in the fifth baffle chamber from above. From the sixth, that is to say the lowest, baffle chamber 1.32 kg. of bis-2-hydroxyethyl terephthalate and 0.04 kg. of ethylene glycol having a temperature of 231° C. were drawn off per hour. About 0.33 kg. of methanol and about 0.60 kg. of ethylene glycol and vaporous by-products were drawn off per hour from the common vapor chamber and condensed. The pressure prevailing in the reactor was atmospheric pressure. The heating oil was introduced into the reactor at its lower end at a temperature of about 240° C. and it left it at its upper end at a temperature of about 182° C. The reaction mixture remained in the reactor for about 2 hours.

We claim:

1. In a process for the continuous preparation of bis-2-hydroxyethyl esters of aromatic dicarboxylic acids selected from the group consisting of terephthalic acid and isophthalic acid and the polymers of said esters which have a low molecular weight and contain up to ten monomer units in the chain the continuous preparation being effected by the interchange of ester radicals of the dimethyl esters of the aforesaid acids with ethylene glycol in the presence of a catalyst in a heated reaction zone maintained at a uniform pressure of from 1 to 4 atmospheres which zone is subdivided into a plurality of zones in which the different stages of the process take place, into which reaction zone ethylene glycol and dimethyl esters of the said acids are continuously introduced and from which reaction zone the vapours which form therein and the bis-2-hydroxyethyl esters which form therein are continuously drawn off, the improvement comprising immediately drawing off the vapours of methanol, ethylene glycol and by-products which form in the reaction zone, preventing the recondensation of said vapors, and introducing additional quantities of ethylene glycol into at least one of the plurality of zones of the reaction zone.

2. A process as claimed in claim 1, wherein a mixture of dimethyl terephthalate and dimethyl isophthalate is subjected to an interchange of ester radicals with ethylene glycol.

3. A process as claimed in claim 1, wherein the pressure prevailing in the reaction zone for the interchange of ester radicals is 1 atmosphere.

4. A process as claimed in claim 1, wherein the interchange of ester radicals is carried out at a temperature within the range of 150° to 240° C., the temperature being increased as the reaction proceeds towards completion.

5. A process as claimed in claim 1, wherein an additional quantity of ethylene glycol is introduced into the reaction mixture in the vaporous state.

References Cited

UNITED STATES PATENTS 2,905,707    9/1959    Hurt et al. _____ 260—475
3,251,657    5/1966    Bachmann et al. _____ 23—285

LORRAINE A. WEINBERGER, *Primary Examiner.*

RICHARD K. JACKSON, *Examiner.*

T. L. GALLOWAY, *Assistant Examiner.*